United States Patent [19]
Howell et al.

[11] 3,737,103
[45] June 5, 1973

[54] DIGITAL LIQUID VECTOR CONTROL SYSTEM

[75] Inventors: Glen W. Howell, Los Angeles; Robert G. Gilroy, Torrance, both of Calif.

[73] Assignee: TRW Inc., Redondo Beach, Calif.

[22] Filed: Aug. 28, 1969

[21] Appl. No.: 853,802

[52] U.S. Cl. ............................................. 239/265.23
[51] Int. Cl. .............................................. B63h 25/46
[58] Field of Search .................... 239/265.17, 265.23; 60/231

[56] References Cited

UNITED STATES PATENTS

| | | | |
|---|---|---|---|
| 2,943,821 | 7/1960 | Wetherbee, Jr. | 244/52 |
| 3,015,210 | 1/1962 | Williamson et al. | 60/242 |
| 3,121,312 | 2/1964 | Hopper | 60/231 |
| 3,128,602 | 4/1964 | Salemka | 60/231 |
| 3,239,150 | 3/1966 | Chisel | 60/231 |
| 3,325,103 | 6/1967 | Abbott | 239/265.23 |
| 3,387,787 | 6/1968 | Colonbani et al. | 239/265.23 |

*Primary Examiner*—Samuel Feinberg
*Attorney*—Daniel T. Anderson, Donald W. Graves and William B. Leach

[57] ABSTRACT

To vary the thrust vector of a rocket engine, simple digitally controlled, injectant powered liquid injection valves are spaced equally around the periphery of a rocket engine nozzle. Vector angle and magnitude information is provided from the guidance system to a controller which converts this information into electrical signals which energize the appropriate injectant valve pilot valves to provide the desired thrust vector angle and side force magnitude.

4 Claims, 4 Drawing Figures

PATENTED JUN 5 1973 3,737,103

Glen W. Howell
Robert G. Gilroy
INVENTORS

BY Donald W. Swaass
ATTORNEY 3,737,103

DIGITAL LIQUID VECTOR CONTROL SYSTEM

BACKGROUND OF THE INVENTION

This invention is related to the field of varying the direction of thrust of a rocket engine used in space.

There have been many attempts in the past to vary the direction of thrust of a rocket vehicle. One very common method is to gimbal the rocket engine. However, this approach requires actuators and flexible propellant lines which adds to the complexity of the system as well as increasing weight which are very important factors in space travel.

Another method of varying the direction of thrust is to provide small attitude control engines. This method has its disadvantages in the need for additional structures such as the extra engines.

In the U.S. Pat. to Hamilton, No. 2,943,822, there is shown an example of a control system utilizing a computer to actuate various thrust control engines. Another example of a control system using independent thrust units is shown in the U.S. Pat. to Boehm, No. 2,974,594.

In the U.S. Pat. to Hopper, No. 3,121,312, there is perhaps shown a thrust vector control system similar to the instant invention but which, in actuality, is quite different therefrom. The Hopper engine is elliptical and is typical of prior art examples in the location of the fluid injector ports.

Another method is to provide a series of injectant ports placed around the periphery of a nozzle which inject a combustible liquid into the exhaust gas flow, creating a shock wave, which in turn creates a side force which deflects the main exhaust stream and the resulting thrust vector. The common terminology for this technique is Liquid Injection Thrust Vector Control (LITVC).

SUMMARY OF THE INVENTION

This invention utilizes the LITVC concept in a simplified mode. The system consists of a series of two position piloted injection valves equally spaced about the periphery of the rocket nozzle in a selected area. Rather than using a closed loop analog (proportional) control, a stepwise (digital) open loop control system is used between the controller and injectant valves eliminating the usual feedback complexities. In addition, the injectant fluid is used for hydraulic power, eliminating the requirement for separate hydraulic power subsystems and/or electromechanical actuators.

Upon more thrust vector demand, a valve on both sides of the original initiator valve is opened. A control system precisely monitors the thrust vector variation needed and responds by sending a command signal to the various pilot valves. The axial location of the injector valve is a function of specific nozzle design, propellants utilized, combustion characteristics, and other factors which typically are determined empirically.

DESCRIPTION OF THE PREFERRED EMBODIMENT

Figure 2:
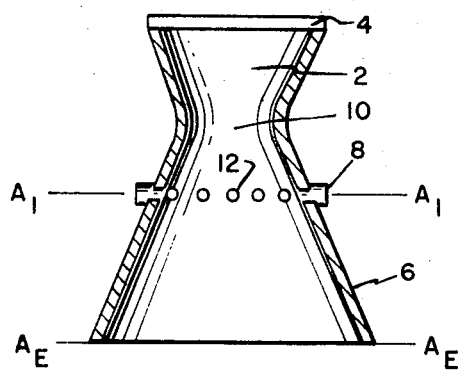
FIG. 2 is a view in cross-section and is illustrative of the axial position of the injector manifolds on a rocket engine.

Referring to FIG. 2, a cross-section of the rocket embodying the thrust vector control system according to this invention is shown. Thus, a combustion chamber 2 with the typical injector 4 and nozzle 6 is shown. The area of the exit of the nozzle taken at location $A_e$ is designated $A_e$ while manifold 8 surrounds an area $A_i$. The relationship of these areas will be more fully explained as this description proceeds.

During normal operation, propellants are introduced through injector 4 and will undergo combustion by any means well known in the art in combustion chamber 2. The gases will pass through throat 10 and expand in nozzle 6 to produce thrust in the conventional manner.

Figure 1:
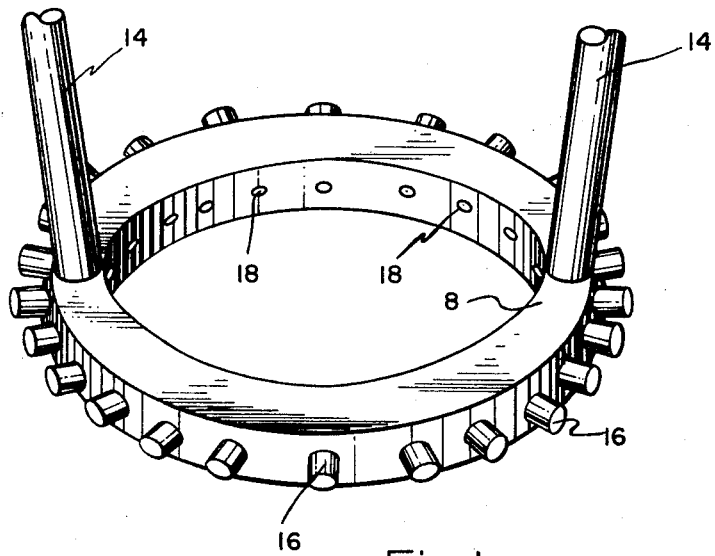
FIG. 1 is a view in perspective of the injector manifold illustrating the location of the valves and injector ports.

Manifold 8 surrounds the nozzle and has as its purpose to contain a liquid, such as one of the propellants, and with actuation of proper valving will inject this liquid through ports 12 into the area of expanding gases. This manifold is more clearly shown in FIG. 1. Conduits 14 carry liquid from tanks not shown or from some other source such as pumps into manifold 8. Valves 16 are normally closed but when actuated will open to allow liquid to be injected through ports 18 as desired. This technique is well known in the art.

This digital injection concept utilizing a simplified injection valve may be used because of the digital controller system. This digital controller, shown schematically in FIG. 4, accepts inputs from the guidance system representing the desired vector angle and side force magnitude. Atypicl electromechanical controller may be a rotary switch and commutator assembly as shown in FIG. 4, although a low cost solid state controller will provide the same function.

Figure 3:
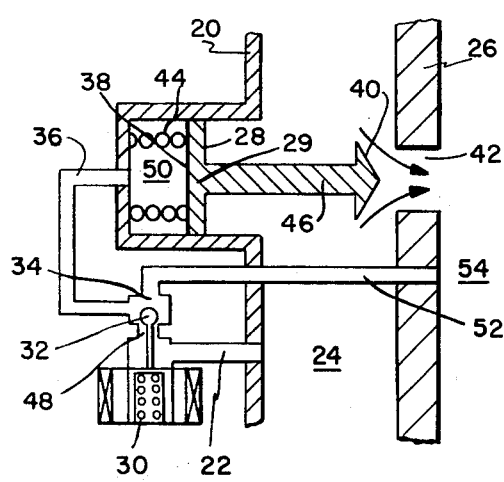
FIG. 3 is a schematic view partially in cross section of one of the injector valves.

A more detailed schematic view of an individual valve is shown in FIG. 3. Manifold volume 24 having a wall 20 is connected to a source of pressurized liquid thru line 22 so that liquid in manifold volume 24 is under pressure which is exerted against manifold wall 20, nozzle wall 26 and the right end 28 of piston 29. A solenoid pilot valve 30 is normally biased (upwardly) so that ball portion 32 seats to close port 34. When this occurs, full liquid pressure is exerted through line 36 against surface 38 of the piston. To bias valve surface 40 so as to close orifice 42, springs 44 are provided tending to move pintle 46 and piston 29 to the right as shown in FIG. 3 so as to close orifice 42.

When solenoid 30 is activated, ball 32 will close orifice 48 while allowing line 22 to supply liquid propellant to manifold valve 24. At the same time, fluid in valve 50 will be dumped through bleed line 52 into the interior of the engine nozzle 54. Accordingly, pressure on piston area 28 will force pintle 46 and piston 29 to the left, overcoming the bias of spring 44 so as to unseat valve surface 40 and to open orifice 42.

Figure 4:
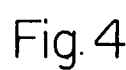
FIG. 4 is a schematic view of the control system.

FIG. 4 is illustrative of a digital controller for actuating the various solenoid valves. When the sensors on the space craft indicate that the thrust angle of the engine is wrong, a thrust angle signal is given to the digital rotation actuator 60. At the same time a thrust level signal will be given to thrust level switches and computator valve shown schematically at 62. The power supply is shown at 64. According to the angle and the thrust level, valve actuation signals are set through leads 66 to the various injector valves 68.

Side thrust level is achieved by simultaneously energizing the total number of valves corresponding to the level of the input signal. Minimum side thrust is provided by opening a single valve at the desired thrust angle location. Increased thrust is provided by successfully opening pairs of valves on either side of the valve located at the desired thrust angle position. The side thrust therefore increases in stepwide increments as successive pairs of valves are opened. Variations in the controller function can incorporate valve sequencing such that any combination of adjacent valves can be opened in any order, i.e., opening of valves one by one rather than in pairs. This is in contrast to the normal procedure of operating valves in two quadrants to obtain the desired thrust angle.

The side force resulting from this liquid injection is the sum of the fluid reaction force and the force caused by the static pressure unbalance resulting from the formation of a shock wave propagating to the main exhaust stream from the injection point. This static pressure force represents 80 to 90 percent of the total side force.

The thrust vector angle corrections required for large boosters are small, usually not exceeding a 2° angle. Assuming a specific impulse of 175 seconds for $N_2 O_4$ used as the injected fluid, the required secondary force is determined as follows.

$$\text{Tan } \theta = (Fs)/(Fa)s$$

$$Fs = \text{Sine } \theta(Fa) \text{ and } (Fa) = 0.0349 \ (200,000)$$

$$(\text{Tan } \theta \approx \text{Sine } \theta \text{ for small angles})$$

$$Fs = 6980 \ lb_f$$

where $\theta$ = maximum correction angle

Fs = required secondary force

Fa = axial thrust = 200,000 $lb_f$ $Fa_{(a)}$ = reduced axial thrust due to vector angle (approximately Fa for small angles)

Using a 20 percent contingency factor, total side force requirement would be 8,400 lbs. Total required flow for the maximum correction of 2° would then be 8,400 lbs. divided by the specific impulse of 175 seconds to give 48 lbs. per second. Assuming an injection port every 7 ½° and further assuming that no more than 7 injectors are required for maximum correction, then the required flow rate per injectant valve is 6.9 lbs. per second.

It has been discovered further by applicants that the axial injection port location greatly influences the efficiency. The optimum location has been found to be at an axial location where the area of the nozzle at the injection ports divided by the exit area of the nozzle lies between the range of 0.30 to 0.45 (see FIG. 2).

Thus, it can be seen that by providing a multitude of injection ports spaced around the nozzle to a liquid as controlled by a digital control system and by utilizing one or other preselected odd number combination of valves at an optimum location on the nozzle, that a simple, efficient and relatively non complex structure is provided for thrust control of large boosters has been obtained.

We claim:

1. A thrust vector control system for a rocket engine having a combustion chamber, a throat and a nozzle which comprises:

a plurality of liquid injector valves located about the periphery of the nozzle at a point where the cross-sectional area divided by the exit cross-section area of the nozzle is from 0.30 to 0.45, each of said valves being adapted to inject liquid into the interior of said nozzle whereby to produce a thrust vector change during operation of said rocket engine, a control system adapted to receive a command signal representing a desired thrust vector change, said control system being adapted to open a predetermined odd number of said liquid injector valves.

2. A thrust vector control system according to claim 1 wherein said control system is a digital open loop system.

3. A thrust vector control system according to claim 1 wherein said injector valves are actuated by a liquid operated pilot valve.

4. A thrust vector control system according to claim 3 wherein said liquid injector valves and said pilot valves utilize liquid from a common source.

* * * * *